United States Patent [19]

Orshansky, Jr. deceased et al.

[11] 4,116,089

[45] Sep. 26, 1978

[54] HYDROMECHANICAL TRANSMISSION

[75] Inventors: Elias Orshansky, Jr. deceased, late of San Francisco, Calif., by Betty Bacon Orshansky, executrix; William E. Weseloh, San Diego, Calif.

[73] Assignee: Orshansky Transmission Corporation, New York, N.Y.

[21] Appl. No.: 787,851

[22] Filed: Apr. 15, 1977

[51] Int. Cl.² ............................................. F16H 47/04
[52] U.S. Cl. ................................... 74/687; 74/720.5
[58] Field of Search ................. 74/687, 688, 750 R, 74/751, 764, 765, 770, 674, 740, 759, 720.5

[56] References Cited

U.S. PATENT DOCUMENTS

| | | | |
|---|---|---|---|
| 3,863,524 | 2/1975 | Mori et al. | 74/759 X |
| 3,888,139 | 6/1975 | Orshansky | 74/687 |
| 3,938,604 | 2/1976 | Kugler et al. | 74/720.5 X |

*Primary Examiner*—Samuel Scott
*Assistant Examiner*—Frank H. McKenzie, Jr.
*Attorney, Agent, or Firm*—Owen, Wickersham & Erickson

[57] ABSTRACT

A power transmission having three planetary assemblies, each having its own carrier and its own planet, sun, and ring gears. A speed-varying module is connected in driving relation to the input shaft and in driving relationship to the three sun gears, all of which are connected together. The speed-varying means may comprise a pair of hydraulic units hydraulically interconnected so that one serves as a pump while the other serves as a motor and vice versa, one of the units having a variable stroke and being connected in driving relation to the input shaft, the other unit, which may have a fixed stroke, being connected in driving relation to the sun gears. The input shaft also drives the carrier of the third planetary assembly. A brake grounds the first carrier in the first range and in reverse and causes drive to be delivered to the output through the first ring gear in a hydrostatic mode. The carrier of the third planetary assembly drives the ring gear of the second planetary assembly, and a first clutching means connects the second carrier with the output in a second range, the brake for grounding the first carrier then being released. A second clutching means enables the third ring gear to drive the output shaft in a third range.

4 Claims, 3 Drawing Figures

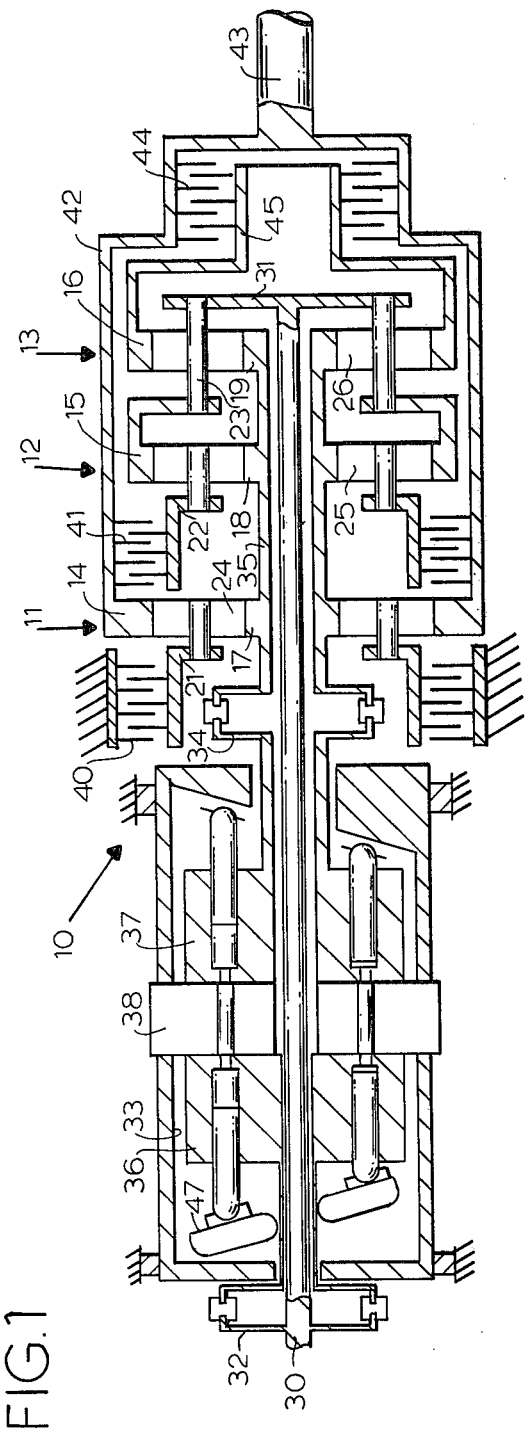
FIG.1
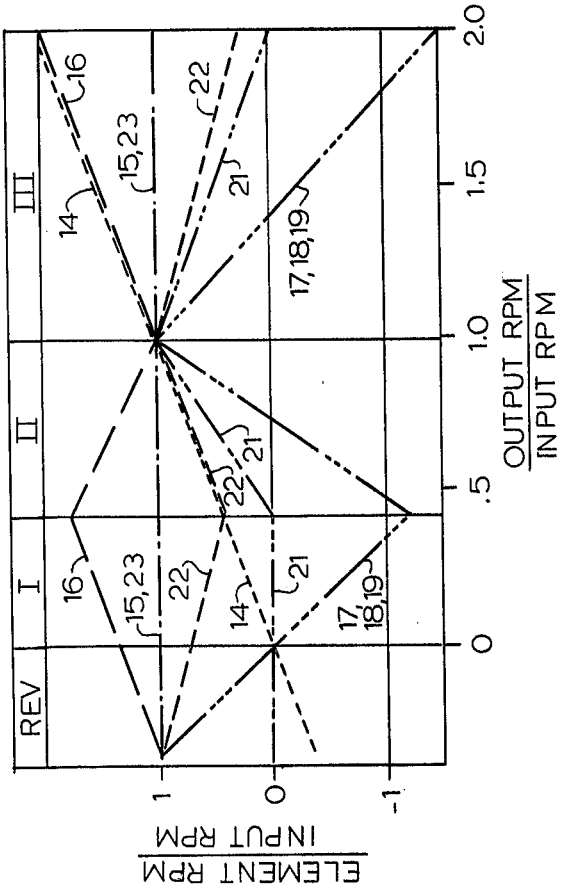
FIG.2
FIG.3

HYDROMECHANICAL TRANSMISSION

The Government has rights in this invention pursuant to Contract No. EY-76-C-03-1165 awarded by the U.S. Energy Research and Development Administration.

BACKGROUND OF THE INVENTION

This invention relates to an improved transmission. It may be considered an improvement on the hydromechanical transmission described in U.S. Pat. No. 3,888,139 which issued June 10, 1975, to Elias Orshansky, Jr.

The transmission of U.S. Pat. No. 3,888,139, and the transmission of the present invention each provide a hydromechanical infinitely variable transmission. Each provides for improved utilization of vehicle engine power by enabling the engine to operate within a narrow speed range which has been optimized for minimum emissions, maximum fuel economy and maximum power, regardless of vehicle operating conditions.

In U.S. Pat. No. 3,888,139 the hydraulic units used as a speed-varying means were driven by gears from either the input or the reaction or both. One object of the present invention is to eliminate those gears, four gears altogether, and their bearings, in order to reduce the size and weight of the transmission and to reduce the cost of the transmission.

It is also an object to provide a transmission which can weigh less than conventional transmissions.

The transmission of this invention has a concentric or coaxial construction and an entirely different hydrostatic start from the transmission of U.S. Pat. No. 3,888,139, in order to provide reduction in the number of parts, the size, the weight, and also the cost of the transmission.

In order to avoid having to use the extra gears which connected the planetary assemblies to the hydraulic units in U.S. Pat. No. 3,888,139, the hydraulic units in the present invention are especially designed to be installed in line with the planetary assemblies without a separate gear drive. This considerably reduces power losses, size, weight and cost.

A conventional torque converter or manual transmission requires the imposition of many compromises upon the engine, because it must provide adequate performance over a wide range of torque and speed. The practice of most vehicle manufacturers of providing a selection of optional axle ratios for the vehicle is only one of the many attempts which have been made to reduce the compromise for any given application.

The infinitely variable transmission of this invention enables the engine to be operated at all times in a speed range in which it is capable of producing rated power. Therefore, vehicle performance in any given application can be maintained or even improved while utilizing a smaller engine. In contrast, infinitely variable transmissions of the pure hydrostatic type are limited to applications where significant power losses can be tolerated in return for the benefits of improved transmission ratio control.

Hydromechanical transmissions offer the control benefits of hydrostatic transmissions, and, since only a portion of the engine power is transmitted by the hydraulic units, they provide a means for removing the performance barrier of excessive power losses. The extend to which any hydromechanical transmission can accomplish this is a function of the percentage of power which must be transmitted hydraulically.

The new transmission hereof can transmit high horsepower over a wide range of output speed variation at a constant input speed and horsepower. It differs from the previous transmissions in its ability to transmit power over a wide range with a minimum of transmitted hydraulic horsepower, and a minimum of installed hydraulic horsepower. It also provides full engine braking over its entire range of operation.

The invention avoids the pitfalls of excessive complexity, speeds, or loads in the gear train. Maximum reliability and minimum cost have been obtained by utilizing standard commercial hydraulic units which are operated totally within their long-life rated conditions of speed and power. In addition, the clutches can utilize the same low-cost paper elements presently employed in high production automobile torque converter transmissions. For a comparable power rating, a smaller number of elements than in a torque converter power shift transmission can be utilized, because at all shift points the clutch elements are virtually synchronous. The number of elements is, therefore, a function not of their thermal capacity, but of their steady-state torque capacity.

This new transmission is valuable for use in passenger and competition cars, highway and off-highway trucks, buses, agricultural and construction equipment, military vehicles, and industrial drives and machine tools.

With this invention it is possible to design transmissions having an extremely wide range of speed and torque variation at full power. This is required in construction and off-highway equipment, for example, where torque multiplication of the order of 18:1 and 24:1 may be encountered. Machine tool drives may require even wider ranges, and they are possible.

The use of this transmission in a piston-engine vehicle enables reduction of exhaust emissions and improvement in the specific fuel consumption by programming the engine to operate within its optimum range under all road conditions without regard to transmission torque output requirements. Both hydrocarbon and nitrogen oxide emissions can be minimized by optimizing the engine for operation in a specific narrow range. In addition, a smaller engine may be utilized for any application, as the transmission enables full engine power to be developed at any vehicle speed except for the lower speeds where the vehicle is traction limited. It is particularly desirable to operate turbocharged diesel engines in a narrow range of speed.

Rotary combustion engines can use this new transmission with the same advantages as for piston engines. The benefit in reduction of hydrocarbon emissions is there of a much greater magnitude, however, due to the high rate of change in emission characteristics for rotary combustion engines with respect to engine speed.

Gas turbines would also be benefited significantly by this invention. Manufacturing cost is a major drawback in producing a turbine today. This, to a large degree, is a function of the complexity required in the design of a turbine for use under the varying torque and speed conditions of a road vehicle. With the hydromechanical transmission of this invention, the turbine can be programmed to operate only under those conditions during which it is most efficient. Therefore, a single-shaft turbine becomes feasible, as it is more economical to manufacture than the two-shaft design normally proposed for vehicle application. Since constant-speed operation is feasible, the problems in connection with the throttle response time of a turbine do not arise. Because there is an infinite variation in speed and torque in the transmission, and no interruption of power flow occurs at any time, the turbine is never unloaded.

SUMMARY OF THE INVENTION

The power transmission of the invention includes, in combination with input means and output means, three planetary assemblies, each having its own carrier and its own planet, sun, and ring gears. All three sun gears are connected together on a common shaft, and a speed-varying module connected to the input drives the sun gears. The speed-varying module may comprise a pair of hydraulic units hydraulically interconnected so that one serves as a pump while the other serves as a motor and vice versa, one of the hydraulic units being connected in driving relation to the input, and the other being connected in driving relation to the sun gears.

The input means drives the carrier for the third planetary assembly, and this third carrier drives the second ring gear. A brake may be used for grounding the first carrier and causing the drive from the speed-varying module through the first set of planetary gears to be delivered to the output means through the first ring gear. A first clutching means can connect the second carrier with the output means for delivering drive to the output from the input through the second and third planetary assemblies. A second clutching means can cause the third ring gear to drive the output means.

The brake is a low-range clutching means used for both reverse and for starting in a Range I; the speed-varying module can be run in reverse, forward, or zero drive, and at varying speeds in forward or reverse, such as by respective strokings of a controlling wobble-plate.

The speed of the second planetary assembly carrier decreases during forward transmission drive in Range I and becomes equal to the speed of the ring gear of the first planetary assembly, because the sun gears are all being driven in an opposite direction to the input means, so as to drive the output means in the forward mode, and this drive of the sun gears in the opposite direction to the input shaft, in combination with the ring gear of the second planetary assembly being driven at input speed, causes the second planetary assembly carrier to decrease in speed to the point where the second planetary assembly carrier may exactly equal the speed of the output.

As the speed of the carrier of the second planetary assembly becomes equal to the speed of the ring gear of the first planetary assembly, then the first clutch is engaged synchronously so as to connect the second planetary assembly carrier with the output for introducing Range II.

During Range II the brake may simply be allowed to slip, producing very low loss, and the speed-varying unit drives the three sun gears initially in the direction opposite to the input and then, later, in the same direction as the input shaft.

The speed of the ring gear of the third planetary assembly decreases during Range II because the third planetary assembly sun gear is being driven by the speed-varying module in a direction for applying a force on its ring gear which tends to counteract the rotational force applied to the third ring gear by the input.

When the third ring gear reaches a speed equal to the speed of the carrier of the second planetary assembly, then the second or high range clutch is engaged putting the transmission synchronously into high range, Range III.

The range shifts in this new transmission occur at synchronized speeds, without interruption of power flow on either the upshift or the downshift. The starting and reverse ranges are hydrostatic and are not considered part of the working ranges. In most cases, the starting and reverse ranges operate at less than maximum power and may approach a maximum constant torque, since maximum output torque may be limited by either maximum pressure or traction. The working ranges are considered to be Ranges II and III, which may operate at full and constant horsepower.

Hydromechanical transmissions have characteristics which are different from both gear boxes and torque converter transmission. Since hydromechanical transmissions develop full static torque while at "stall," the engine needs to develop only the horsepower necessary to make up the transmission losses. This is considerably less horsepower than that required to develop stall torque in a torque converter transmission.

However, since this horsepower is a dead loss, with the vehicle standing still, the amount of heat developed may be greater than the average heat rejection requirement when operating in the full horsepower ranges. Therefore, one of three methods of protecting against excessive temperature rise must be used as described in the immediately following paragraphs:

a. Transmission may have such a wide ratio as to exceed the traction limit in torque requirement.

b. Controls may be provided to either unload the hydraulic system if torque capacity of the transmission has been exceeded or limit the engine input.

c. A large enough heat exchanger capacity has to be supplied.

BRIEF DESCRIPTION OF THE DRAWINGS

In the drawings:

FIG. 1 is a diagrammatic view in elevation and in section of a transmission illustrating the principles of this invention.

FIG. 2 is a speed lines diagram with the ratio of output speeds to input speeds, in r.p.m. being plotted against the ratio of the speeds of the planetary members to the input speeds in r.p.m. The three forward ranges and the reverse range are identified.

FIG. 3 is a brake and clutch engagement and range diagram.

DESCRIPTION OF THE PREFERRED EMBODIMENT

A transmission 10 of this invention has three planetary assemblies 11, 12, and 13 having respective ring gears 14, 15, and 16; respective sun gears 17, 18, and 19; and respective carriers 21, 22, and 23 with respective planet sets 24, 25, and 26. The three planetary assemblies 11, 12, and 13 may be identical or may be somewhat different.

The planetary assemblies 12 and 13 are variable planetary assemblies and constitute an assembly like that shown in U.S. Pat. No. 3,888,139, having the same functions. The planetary assembly 11 is a hydrostatic first range and reverse planetary assembly.

An input shaft 30 directly drives a connector 31, which is secured to the planetary gear carrier 23 of the third planetary assembly 13. The third carrier 23, which is driven by the input shaft 30, is rigidly connected to the second ring gear 15. The input shaft 30 is also drivably connected by a suitable elastic coupling 32 to a speed-varying hydraulic module 33, the other end of which is connected by a suitable elastic coupling 34 to a hollow shaft 35 that rigidly joins all three sun gears 17, 18, and 19 together. The module 33 comprises a variable-displacement hydraulic unit 36 in driving relationship with a fixed-displacement hydraulic unit 37, with hydraulic fluid transmitted between them through a stationary port plate block 38.

A brake 40, when engaged, holds the first carrier 21 stationary. A first clutch 41, when engaged, connects the second carrier 22 to a drum 42, which, in turn, is connected to an output shaft 43. The first ring gear 14 is rigidly connected to or directly mounted on the drum 42. A second clutch 44, when engaged, connects the third ring gear 16 (via a member 45) to the drum 42 and therefor to the output shaft 43. Thus, the input shaft 30, output shaft 43, hydraulic units 36, 37 and planetary assemblies 11, 12, and 13 are all co-axial.

When the brake 40 is engaged, the first planetary gears 24 rotate but are arrested in their planetary motion. This makes a reversing drive between the first sun gear 17 and the first ring gear 14, causing a rotation of the first ring gear 14 which is reversed in rotation to that of the first sun gear 17.

So the sequence is that the low-range brake 40 is engaged for starting (and also for reverse), causing the driving connection between the sun gear 17 and the drum 42 through the planetary gears 24 and ring gear 14, causing the first ring gear 14 to run in a reverse direction and at a reduced speed with respect to the sun gear 17. The sun gear 17 itself is driven by the speed-varying module 33 during starting and reverse.

In this region the drive is purely hydrostatic, and when the variable-displacement hydraulic unit 36 is on zero stroke, the vehicle is at a standstill, since no drive is then coming through the speed-varying module 33 and since the brake 40 is engaged.

If the wobble plate 47 of the variable-displacement unit 36 is stroked in one direction, it is in reverse, and if the wobble plate 47 is stroked in the opposite direction, it is in forward. When the wobble plate 47 is stroked in forward, the sun gear 17 traverses in speed from zero to a negative speed, as shown in Range I in FIG. 2, and with the carrier 21 of the first planetary assembly 11 grounded by the brake 40, the first ring gear 14 increases from zero in output speed, as shown in Range I in FIG. 2.

During Range I, the drive on the second planetary gears 25 from the input through the second ring gear 15 is counteracted by the drive on the planetary gears 25 from the second sun gear 18, thus decreasing the speed of travel of the carrier 22.

Thus, during Range I the forward speed of the second carrier 22 decreases because of acceleration of the counteracting drive on the second sun gear 18, as shown in FIG. 2 until the forward speed of the second carrier 22 becomes equal to the forward speed of the first ring gear 14, at which point the first clutch 41 is engaged, and the transmission goes into Range II.

The drive is then from the second carrier 22 to the output shaft 43. The first ring gear 14 from then on has no driving function, and the low-range rake 40 simply slips, producing some loss, but such losses are usually very low.

When the end of Range II is reached, the speed of the third ring gear 16 has decreased to equal the speed of the second carrier 22, and it is possible to engage the high-range second clutch 44, which puts the transmission into the high Range III.

The first planetary assembly 11 containing the ring gear 14 may be identical to the other two planetary assemblies 12 and 13, if this results in significant cost savings, but they need not be identical. The planetary gears 24, 25, and 26 are preferably identical, even though the rings and carrier supports may differ. In practice, it is better to make all of the rings identical so that parts are interchangeable.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A power transmission comprising:
    a stationary frame,
    input means,
    output means,
    first, second and third planetary assemblies each having a sun gear, a ring gear, and a carrier with planet gears, all said sun gears being rigidly connected together, the ring gear of said first planetary assembly being rigidly connected to said output means, the ring gear of said second planetary assembly being connected to the carrier of said third planetary assembly and therethrough to said input means,
    a reversible speed-varying module connecting said input means to said first sun gear,
    braking means for releasably connecting said carrier of said first planetary assembly to said frame, whereby when said braking means is engaged, said output means is driven from said input means through said speed-varying module and said first planetary assembly,
    first releasable clutching means for connecting said carrier of said second planetary assembly with said output means, and
    second releasable clutching means connecting said ring gear of said third planetary assembly to said output means.

2. The power transmission of claim 1 wherein said speed-varying module comprises:
    a pair of hydraulic pump-motor units hydraulically interconnected so that one serves as a pump while the other serves as a motor and vice versa, and
    a first said hydraulic pump-motor unit being connected in driving relation to said input and a second said hydraulic pump-motor unit being connected to said first sun gear.

3. A power transmission according to claim 2 wherein said first hydraulic pump-motor unit is variable in stroke and runs during operation at input speed while said second pump-motor unit is fixed in stroke and variable in speed.

4. The power transmission of claim 1 wherein said speed-varying module is connected to said input by a first flexible coupling means and is connected to said sun gear of said first planetary assembly by a second flexible coupling means.

* * * * *